Aug. 17, 1948.　　　　J. G. HAYES　　　　2,447,012
WELDING OF KEYS TO CAN ENDS
Filed Feb. 21, 1945　　　　　　　　2 Sheets-Sheet 1
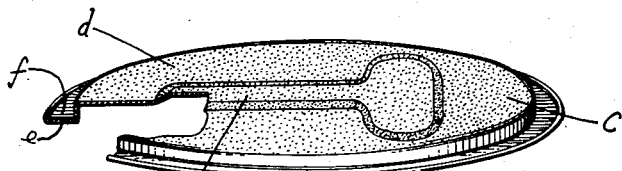
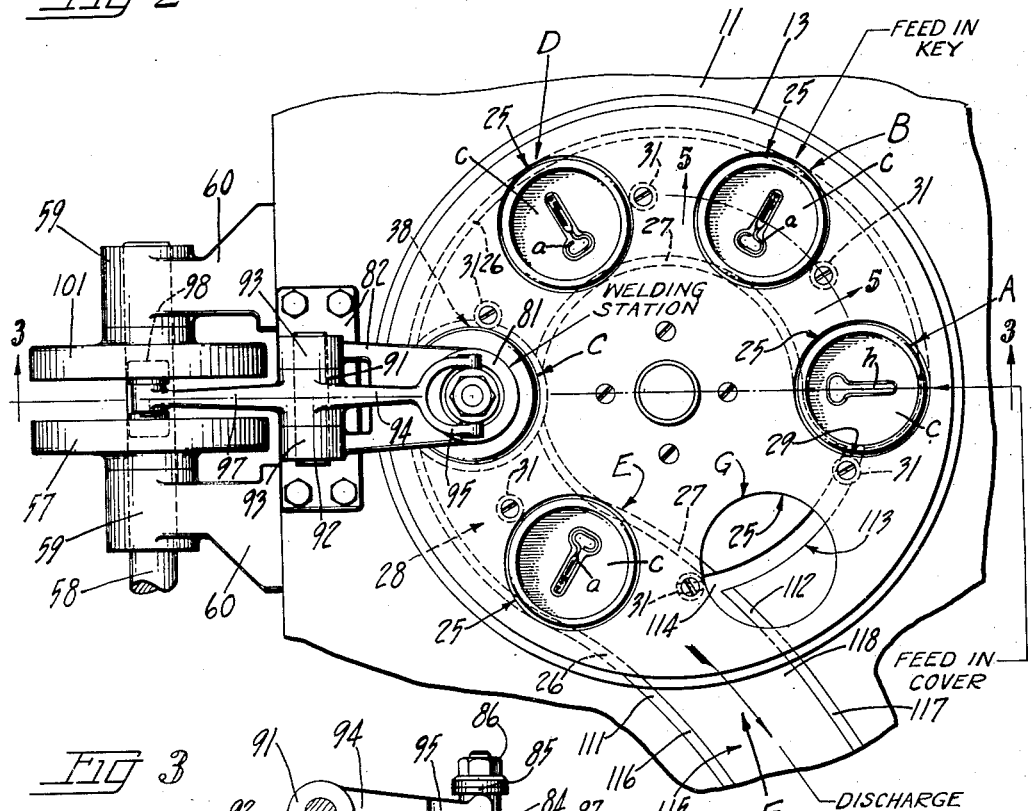
INVENTOR.
John G. Hayes
BY Ivan D. Thornburgh
Charles H. Gune
ATTORNEYS

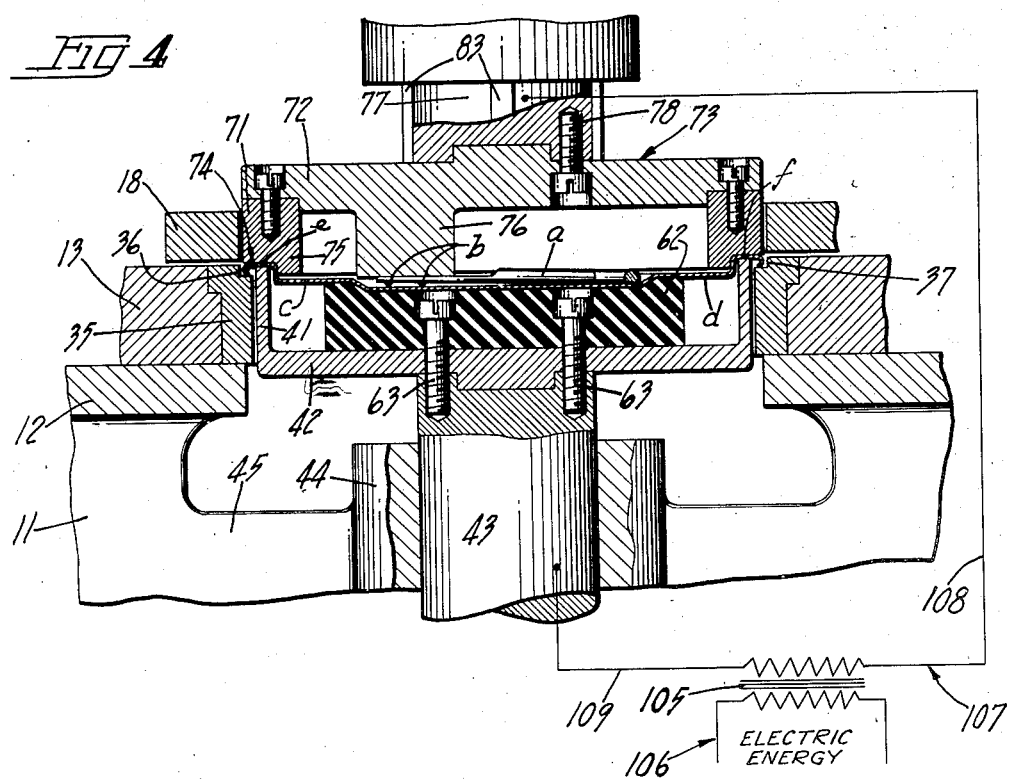
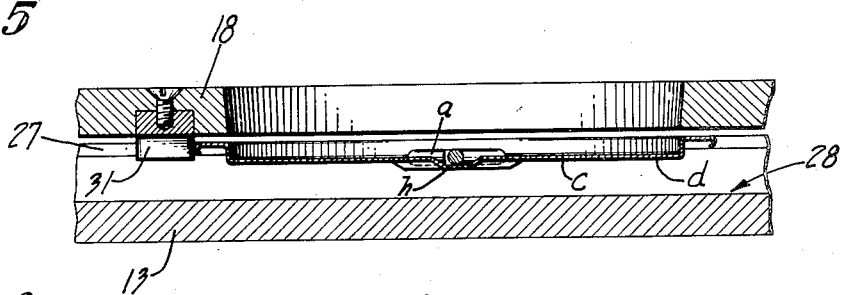
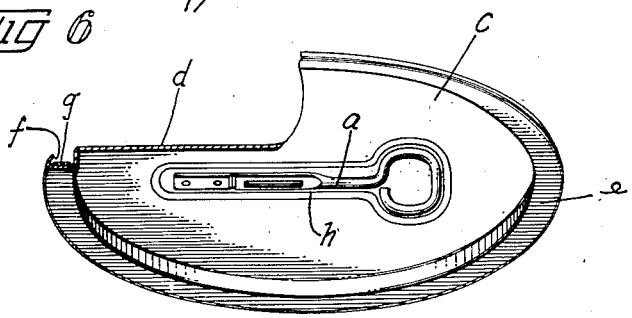

Patented Aug. 17, 1948

2,447,012

UNITED STATES PATENT OFFICE 2,447,012

WELDING OF KEYS TO CAN ENDS

John G. Hayes, San Mateo, Calif., assignor to American Can Company, New York, N. Y., a corporation of New Jersey Application February 21, 1945, Serial No. 579,021

5 Claims. (Cl. 219—4)

This invention relates to an apparatus for electrically welding opening keys on sanitary can ends and has particular reference to holding the key in welding position on the exterior surface of a can end which carries a protective coating on the inner surface, which coating may have electric current insulating or non-conducting properties, so that one electrode engages against that uncoated non-insulating portion of the coated surface of the can end which constitutes the gasket lining groove of the end.

In the can making art it is often desirable to have a protective coating on the inner surface of the can end and it has been found that the most effective coating requires a high baking temperature. The can manufacturer therefore has applied the protective coating on the flat sheet or blank prior to the can body or the can end being formed from such sheet or blank. The gasket material for the end joints between the can end and the can body will be applied later and accordingly the outer flange portion of the area of the can end is left uncoated since this is the part that will subsequently include the lining groove of the end, this area being in contact with the lining material.

The present invention contemplates an apparatus designed for welding by engagement of one of the electrodes in the uncoated lining groove of the end, the opposite electrode engaging the key which is positioned on the opposite surface of the end.

An object of the invention is the provision of an apparatus for welding keys to can ends having a portion of the surface constituting the interior surface coated with a protective coating and having a surrounding uncoated lining groove in the flange portion of the end, which uncoated portion is utilized for engagement with one of the electrodes during welding while the other electrode engages the key and holds it in close metal to metal contact with the opposite surface of the can end.

A further object of the invention is the provision of a welding apparatus of the character described wherein a can cover and a key are brought into position between two electrodes at a welding station, one electrode engaging the flanged uncoated portion of the can end and the opposite electrode engaging the key.

Still another object is the provision of a can end and opening key holding device located at a welding station wherein the annular lining groove formed in the flange portion of the can end receives an annular electrode, the can end being held down at the flange to obtain a better welding contact at this place while the key is similarly held in close metal to metal contact with the can end at another place, neither electrode or other apparatus part causing burning or other defacement of the coated surface.

Yet another object is the provision of a welding apparatus of the character described which functions to support the coated portion of one surface of a can end by means of an insulating member to the end that the key and can end are more positively held in close metal to metal contact for the welding apparatus without marring the surface coating of the end.

Numerous other objects and advantages of the invention will be apparent as it is better understood from the following description, which, taken in connection with the accompanying drawings, discloses a preferred embodiment thereof.

Referring to the drawings:

Figure 1 is a perspective view of an inverted can end having a portion of its inner surface coated with a protective coating, such an end being adapted for welding thereto of an opening key by means of the apparatus of the present invention.

Fig. 2 is a plan view of the principal parts of a welding apparatus embodying the present invention;

Fig. 3 is a longitudinal vertical sectional view of the apparatus as taken substantially along the line 3—3 in Fig. 2, parts being shown in front elevation;

Fig. 4 is an enlarged vertical sectional detail of the welding head illustrating a can end and an opening key in position for welding;

Fig. 5 is an enlarged view in vertical section taken substantially along the line 5—5 in Fig. 2; and Fig. 6 is a perspective view of the can end with its welded key, this view showing the outer exposed opposite surface of the end as compared with Fig. 1 and indicating the effect of a subsequent lining step which has applied a lining compound in the can end groove.

In the present invention the welding apparatus is of such a nature as to adapt it for the welding of metal opening keys $a$ (Fig. 6) having the usual welding projections $b$, to paneled metal can ends $c$ in which the interior surface of the can end is centrally coated with a protective coating $d$. This coating extends over the surface which will be exposed on the interior of the can after the end has been double seamed to the can body in the usual manner but the surrounding outer flange portion of the end indicated by the letter e is left uncoated. This flange portion of the end embodies a usual gasket lining groove f which is formed to receive the usual compound lining gasket g.

It is desirable in automatically welding keys to can ends that provision be made for centering the key in its desired location in the can end. Accordingly there is illustrated a key receiving depression h (Figs. 1, 5 and 6) in the center of the outer depressed paneled surface. The key after being first assembled with the can end will be retained in correct position in this depression for conveyance to the welding station.

The principal parts of a suitable welding apparatus are best shown in Figs. 2 to 4, inclusive, and comprise in general a frame 11 formed with a flat top portion 12 on which is mounted a disc plate 13 constituting a support for a can end c. The frame 11 is formed with a depending boss 15 which provides a bearing for a vertical shaft 16 which carries a shouldered sleeve 17, on which is mounted a turret 18. The shouldered sleeve 17 is adapted to rotate within the boss 15 and with the shaft 16 to which it is keyed. The turret 18 is fastened onto the top of the sleeve, the disc plate 13 being formed with a clearance opening 19 to allow such attachment.

The turret 18 receives a can end c at a cover feed station A (Fig. 2) and an opening key a at a key feeding station B. The turret positions the assembled end and key at a welding station C for the welding operation. For this purpose the turret is formed with a plurality of circular openings 25 arranged concentric to the axis of the turret shaft 16. These openings 25 are slightly larger than the diameter of a can end b and at the cover feeding station A the can end is dropped into an opening from above, in any suitable manner.

In coming into position within the opening 25 at the station A, the can end falls upon two spaced concentric shoulders or circular tracks 26, 27 cut in the upper surface of the disc plate 13. A depression groove 28 having the bottom of the groove lower than the upper surfaces of the tracks is cut in the disc plate between the tracks to clear the countersunk panelled center of the can end. This is best indicated in dotted lines in Fig. 2 and in full lines in Figs. 3 and 5. One end of the groove 28 at station A takes the form of a circular end wall 29 having its center aligned with the center of the opening 25 of the turret at that station.

The circular concentric tracks 26, 27 guide the can end through stations A and B, and idle station D, to the welding station C. After welding the tracks continue to another idle station E and thence to a discharge station F.

The turret 18 is intermittently rotated so that each of its openings 25 is brought to rest at each of the stations A, B, D, C and E. Accordingly a can end c having been fed into the turret at the station A, is next advanced to station B by the intermittent rotation of the turret. To effect such advancement of the end, a feed block 31 (Figs. 2 and 5) is secured to the under surface of the turret 18 just back of the edge of an opening 25. This block extends down below and engages with the edge of the can end. During the advancement of the ends the block 31 passes along through the groove 28, the curled edge of the can end moving along and being supported by the shouldered tracks 26, 27.

At station B the opening key a is fed from above onto the can end in any suitable manner so that the welding projections b are at the bottom, that is, these projections come into contact with the upper panelled surface of the can end. In such a feeding action the key drops inside of the depression h which depression as already suggested retains the key in proper centralized position relative to the can end until the key is welded into its more permanent position on the end.

At the next step rotation of the turret the can end with its pocketed key is advanced to station D and is brought to rest. This is an idle station and no work is accomplished. It will be understood that during the advancement and rest of the can end at stations A, B and D, its coated portion d is free of the bottom of the groove 28, the curled edge of the end resting on the tracks 26 and 27. In this way scratching of the coated surface is prevented.

At the next step rotation of the turret, the can end with its key is brought to rest at the welding station C. At this station the disc plate 13, in which the tracks 26, 27 are cut, is bored out to receive an insulated stepped ring 35 (Figs. 2 and 4) which extends entirely through the disc plate. The upper surface of this ring is flush with the upper surface of the disc plate and the ring is cut with circular slots leaving shoulders 36 and 37 to form a continuous adjoining track section for the curled edge of the can end while at the station C. This curved track section has the upper surfaces of the shoulders 36, 37 flush, respectively, with the tracks 26, 27 and there is also a clearance groove 38 corresponding to the depression 28 in the disc plate.

In the centered position of the can end (Fig. 4) at station C, the end is directly over but spaced above a lower electrode 41. Electrode 41 is annular in shape and is concentric with the insulating ring 35. It is narrower than the width of the lining groove f of the can end. The electrode 41 may be built up as shown, being of cuplike construction, the annular electrode proper merging at the bottom into a circular base 42. This electrode unit is mounted upon the upper end of a shaft 43 which is vertically movable within a boss 44 formed in a bracket 45 (see also Fig. 3) constituting a part of the frame 11.

The shaft 43 extends below the boss 44 and is reduced in diameter as a lower stem 46. The stem carries a grooved collar 47 which is held on the stem by a lock nut 48, threaded into the end of the shaft. A spring 49 is located on the stem between the collar 47 and the enlarged section of the shaft. This provides a yielding connection for the shaft and allows for raising of the lower electrode 41 under a spring compression.

The lower electrode 41 is raised and lowered by cam action and for this purpose a lever 51 is pivotally mounted on a fixed horizontal pin 52. One arm of the lever is formed with a yoke section 53 which is of a shape to straddle the grooved section of the collar 47. The ends of the yoke have rounded surfaces on opposite sides of the collar where it engages in the groove. The pivot pin 52 may be held in lugs 54 projected down from the frame bracket 45.

The opposite arm of the lever 51 extends outwardly and radially and carries a cam roller 55. This roller is adapted to operate in a cam groove 56 formed in a face cam 57 which is mounted on and rotates with a horizontal shaft 58. Shaft 58 is journaled in bearings 59 formed in brackets 60 which may be bolted to the frame 11. The shaft 58 is continously rotated in any suitable manner.

Centrally of the lower electrode 41 is an insulating disc or plate 62. This may be held centrally of the electrode base 42 by bolts 63 which preferably extend not only through the electrode base but also hold the electrode in position by threadedly engaging the upper end of the shaft 43.

An insulated hold-down ring 71 (Fig. 4) is located at the station C and is held on a disc-like base 72 of an upper electrode member 73. At the time the can end comes to rest in station C preparatory to welding, the hold-down ring 71 is in a raised position. The bottom of the ring is relieved along its outer corner periphery as at 74 the unrelieved part extending down as a depending lower annulus 75 which is slightly smaller than the counter-sink panelled diameter of the can end.

The upper electrode member 73 includes an integral depending portion 76. The lower face of the said electrode portion is substantially flush with the lower face of the hold-down ring 71. This electrode is spaced above and in alignment with the end portion of the key a when cover and key are brought into the welding station. The hold-down ring base 72 is secured to the lower end of a vertically movable shaft 77 by screws 78. This shaft is preferably disposed in axial alignment with the lower electrode shaft 43.

The shaft 77 (see also Fig. 3) is adapted to move up and down within a boss 81 formed on an upper bracket 82 (see also Fig. 2) which is mounted upon and secured to the frame 11. Shaft 77 preferably is splined at 83 to prevent turning within the boss 81 and it extends above the boss. This shaft is formed with a reduced diameter, upper stem 84 which passes through a grooved collar 85, the latter being retained upon the shaft by a lock bolt 86 threaded into the upper end of the shaft. A compression spring 87 is located on the stem 46 and is confined between the lower edge of the grooved collar 85 and the shouldered part of the shaft 77. This provides a yielding connection for the shaft and allows for lowering of the upper electrode 76 and the hold-down ring 35 under a spring compression.

The shaft 77, the electrode 76 and the hold-down ring 71 are moved up and down by cam action. For this purpose there is provided a lever 91 (Figs. 2 and 3) which is mounted on a pivot pin 92 carried in bearings 93 formed in the bracket 82. An inner arm 94 of the lever 91 is formed with a yoke 95 which operates in the groove of the collar 85. The ends of this yoke straddle the collar 85 and are rounded to engage the groove walls of the collar.

An outer arm 97 of lever 91 extends down and projects outwardly in an end which carries a cam roller 98. This roller operates in a cam groove 99 formed in a face cam 101 secured to and rotatable by the shaft 58.

With the can end c and its opening key a at rest at station C and between the upper and lower electrodes, the cams 57, 101 operate their respective levers 51, 91 to raise the lower electrode 41 and parts carried thereby and to lower the upper electrodes 76, the hold-down ring 71 and parts carried thereby. This position is shown in Fig. 4.

In attaining such a position, the insulating disc 62 moves up against the coated surface d of the can end c and the annular lower electrode 41 passes into the lining groove f where it engages against the uncoated flange part e of the can end. At the same time the hold-down ring 71 moves down and backs up the flange of the can end. The annulus 75 of the hold-down ring centers the can end and then holds it in correct welding position. The upper electrode 76 presses down against the end of the key a and the welding projections b are pressed into tight metal engagement with the upper surface of the can end as it is supported on the insulating disc 62. This is the welding position.

With the parts thus in proper position, a suitable welding current is passed between the upper electrode 76 and the lower electrode 41 by way of the opening key a and through its welding projections b, and by way of the can end wall and its flange e where it engages the lower electrode. In addition Fig. 4 discloses a wiring diagram which indicates a source of electric energy for the welding operation. This is shown in the form of a welding transformer 105 having a primary circuit 106 and a secondary circuit 107.

The secondary circuit includes a wire 108 leading from the transformer 105 through the shaft 77 and electrode member 73 to the upper electrode portion 76 and a wire 109 leading from the transformer 105 to the lower electrode 41 by way of the shaft 43.

After the opening key a has been welded to the can end c the end and key are advanced by the turret 18 to the idle station E (Fig. 2). At this station no work is accomplished and following the rest period the end with its attached key is moved next to the discharge station F. The discharge of the can end at station F takes place prior to the pocket 25 of the turret, in which the can end is located, coming to rest at the next adjacent station, this being at an idle or blank station G.

Just beyond the idle station E and at the approaches of the discharge station F the shouldered track 26 formed in the disc plate 13 terminates and a lateral discharge track 111 formed in the disc plate forms a continuation of the track. Opposite this the track 27 also terminates and joins into a continuing lateral track 112, also formed in the disc plate.

The groove 28 also terminates at the discharge station F, since it is here that the can end leaves the turret 18. An arcuate clearance groove 113 is cut in the disc plate 13 between stations F and A and this provides clearance for the block 31 during its passage through idle station G. The groove 113 is not as deep or as wide as the groove 28 and accordingly a shoulder 114 is formed at the discharge station F where the groove 113 joins with the groove 28. This shoulder assists in stripping the can end with its key from its position below the opening 25 of the turret, the block 31 camming the end outwardly and causing the curled edge of the end to pass onto the discharge tracks 111, 112.

A discharge chute 115 which may be an integral part of the frame 11, extends outwardly from the discharge station F. This discharge chute is formed with groove tracks 116, 117 which form continuations of the tracks 111, 112. The disc plate as well as the discharge chute are also grooved at 118 for clearance of the panelled center of the end. By means of this construction the can end with its attached key is swept from the turret 11 and from the disc plate 13 discharging from the machine by way of the discharge chute 115.

The discharge chute may lead into a gasket liner or other suitable machine wherein the gasket g is deposited in its lining groove f. This lining step, however, forms no part of the present invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for attaching an opening key having a welding projection thereon to a can end having a protective surface coating on a portion only of one side thereof, the combination of an electrode for engaging the uncoated portion of the partially coated can end surface, a second electrode for pressing an opening key against the opposite surface of the can end to force the key welding projection into close metal to metal contact with the can end, spaced electrically insulated means on opposite sides of the can end respectively disposed oppositely to said electrodes for clamping the can end therebetween during a welding operation, and electrical means for passing a welding current between said electrodes through the key and can end to fuse them together in a permanent welded bond.

2. In an apparatus for welding metallic opening keys having welding projections thereon to sheet metal can ends having a protective coating covering a portion of the surface on one side thereof, the combination of an electrode for engaging the uncoated portion of the coated can end surface, a second electrode for pressing an opening key against the opposite surface of the can end to force the key welding projections into close metal to metal contact with the can end, said electrodes being spaced from one another in the plane of the can end surface for the described purposes, spaced electrically insulated means on opposite sides of the can end respectively disposed oppositely to said electrodes for clamping the can end therebetween during a welding operation, and electrical means for passing a welding current between said electrodes through the key and can end to fuse them together in a permanent welded bond.

3. In an apparatus for welding metallic opening keys having welding projections thereon to sheet metal can ends having a protective coating covering a central portion of the surface on one side thereof and also having an uncoated flanged peripheral portion, the combination of a movable electrode for engaging the uncoated flanged portion of the can end surface, a second movable electrode for holding an opening key against the opposite surface of the can end to force the key welding projections into close metal to metal contact with the can end, said electrodes being spaced radially from one another in the plane of the can end surface, electrically insulated means for holding the uncoated flanged edge portion of said can end against said first mentioned electrode, a second electrically insulated means spaced inwardly from said first mentioned insulated means for holding the can end engaged opening key against said second electrode, and electrical means for passing a welding current between said electrodes and through the key and can end to fuse them together in a permanent welded bond.

4. In an apparatus for welding metallic opening keys having welding projections thereon to sheet metal can ends having a protective coating covering a central portion of the surface on one side thereof and also having an uncoated flanged edge portion, the combination of a turret for conveying and for centering a can end into a welding station, a movable electrode for engaging the uncoated flanged portion of a can end at said station, a support plate for holding the can end while at said station, a hold-down member for retaining the can end against said electrode and against said plate, a second movable electrode for pressing against an opening key positioned on the can end to force the welding projections of the key into close metal to metal contact with the can end, and electrical means for passing a welding current between said electrodes and through the key and can end to fuse them together in a permanent welded bond.

5. In an apparatus for welding metallic opening keys having welding projections thereon to sheet metal can ends having a protective coating covering a central portion of the surface on one side thereof and also having an uncoated flanged edge portion on said side, the combination of feeding means for conveying and for centering a can end into a welding station, a movable annular electrode for engaging the uncoated flanged portion of a can end at said station, a movable centrally disposed insulating plate for engaging and holding the coated portion of the can end at said station, a movable insulating ring for retaining the can end on said plate and on said electrode when the parts are in engagement with a can end, an opposed centrally disposed electrode movable with said ring for pressing against an opening key positioned adjacent a can end while held against said plate to force the welding projections into close metal to metal contact with the can end, and electrical means for passing a welding current between the said electrodes and through the key and can end to fuse them together in a permanent welded bond.

JOHN G. HAYES.

REFERENCES CITED

The following references are of record in the file of this patent:

UNITED STATES PATENTS

| Number | Name | Date |
|---|---|---|
| 1,296,780 | Dyer | Mar. 11, 1919 |
| 1,635,536 | Butter | July 12, 1927 |
| 1,699,091 | Butter | Jan. 15, 1929 |
| 1,863,850 | Halloway | June 21, 1932 |
| 2,326,805 | Shmurak | Aug. 17, 1943 |
| 2,338,002 | Mero | Dec. 28, 1943 |